United States Patent

Gunther et al.

[11] Patent Number: 5,544,092
[45] Date of Patent: Aug. 6, 1996

[54] METHOD AND APPARATUS FOR CONFIGURING AN INTEGRATED CIRCUIT

[75] Inventors: Stephen H. Gunther; Gerard D. Blank, both of Folsom; James T. Curry, El Dorado Hills; Jeff Draeger, Folsom, all of Calif.

[73] Assignee: Intel Corporation, Santa Clara, Calif.

[21] Appl. No.: 202,337

[22] Filed: Feb. 25, 1994

[51] Int. Cl.$^6$ ........................................ G06F 1/06
[52] U.S. Cl. ................... 395/800; 364/271.9; 364/232.9; 364/950
[58] Field of Search ..................................... 395/550, 775, 395/800

[56] References Cited

U.S. PATENT DOCUMENTS

| | | | |
|---|---|---|---|
| 3,941,989 | 3/1976 | McLaughlin et al. | 364/707 |
| 4,279,020 | 7/1981 | Christian et al. | 395/750 |
| 5,237,689 | 8/1993 | Behnke | 395/700 |
| 5,301,165 | 4/1994 | Ciraula et al. | 365/233.5 |
| 5,329,634 | 7/1994 | Thompson | 395/500 |
| 5,467,449 | 11/1995 | Gauronski et al. | 395/185.1 |

OTHER PUBLICATIONS

*Intel 486*™ *DX Microprocessor Data Book,* 1–6, 14, 89 Nov. (1992).

*Primary Examiner*—David Y. Eng
*Attorney, Agent, or Firm*—Blakely, Sokoloff, Taylor & Zafman

[57] ABSTRACT

A configuration selection circuit for determining an operating characteristic of an integrated circuit by selecting a configuration option is disclosed. The configuration selection circuit includes an input, an output, a driver circuit, and a selector circuit. Selecting a configuration option is done by taking at least two samples of the voltage level on the input pin in order to construct an input configuration waveform. This input configuration waveform is compared to a plurality of predetermined configuration waveforms. If a match is made, the configuration option corresponding to the input configuration waveform is selected.

32 Claims, 5 Drawing Sheets

SAMPLER STATE MACHINE

METHOD AND APPARATUS FOR CONFIGURING AN INTEGRATED CIRCUIT

BACKGROUND OF THE INVENTION

1. Field of the Invention

The present invention relates generally to the field of configuring modes of operation for integrated circuits and specifically to the selection of a clock multiplier for defining the internal clock frequency of a processor.

2. Art Background

The mode of operation for processors and other complex integrated circuits (ICs) is often defined by selecting among configuration options for various operating characteristics. For example, the internal clock speed for the Intel microprocessor architecture IntelDX4™ microprocessor manufactured by Intel Corporation of Santa Clara, Calif., is selectable between two times and three times the system clock speed. Some operating characteristics, such as the internal clock speed of the IC, typically must be defined before normal operation begins, while other operating characteristics may be defined after the start of normal operation.

A typical prior art method for selecting configuration options prior to normal operation requires the sensing of a voltage level, either logic high or logic low, on a dedicated or multiplexed input pin at some time during or after powering up the device. Typically, for binary logic, one input pin can only provide two configuration options. Three state logic may be used, but it is often very difficult to design with three state logic. In a binary logic design, if more configuration options are desired, more input pins, either dedicated or multiplexed, must be allocated. Allocating dedicated pins is undesirable because input pins are a limited and often scarce resource. Using multiplexed pins is undesirable because this method typically requires the use of a strapping resistor for each multiplexed input pin and because the number of available multiplexed pins is typically limited. Strapping resistors create DC paths, wasting system power, and using more strapping resistors results in greater power loss. This power loss is especially troublesome for battery-powered mobile personal computer systems such as laptop computers.

A typical prior art method for configuring a device after normal operation has begun uses software that selects the appropriate options by writing the correct information to one or more configuration registers. The primary disadvantage of this method is that it cannot be used to define operating characteristics that must be defined before normal operation of the integrated circuit can begin. Typically, software cannot be executed by a processor unless it is operating normally.

Neither of these prior art methods are appropriate when the goal is to define operating characteristics prior to the start of normal operation by selecting among three or more configuration options. The first method requires allocating more input pins, which may be difficult to do given the typical problem of having a lack of available input pins. The second method typically cannot be used until after normal operation begins. Therefore, a configuration selection circuit according to one embodiment of the present invention provides for the use of a single input pin for selecting between three or more configuration options. As will be described, an input configuration waveform is sampled at the input pin and compared to a plurality of known configuration waveforms. If a match is made, the configuration option corresponding to the matched configuration waveform is selected.

SUMMARY OF THE INVENTION

A method and apparatus for defining an operating characteristic for an integrated circuit by selecting one of a plurality of configuration options is disclosed. In one embodiment, a configuration selection circuit is provided. The configuration selection circuit includes an input, a driver circuit, and a selector circuit. The input and output pins may be dedicated or multiplexed pins for the integrated circuit.

In a first embodiment the configuration selection circuit takes a minimum of two samples of the voltage level on the input pin in order to construct an input configuration waveform. This input configuration waveform is compared to a plurality of known configuration waveforms. If a match is made, the configuration option corresponding to the input configuration waveform is selected.

The input configuration waveform is determined by the signal coupled to the input pin. The DC signals of VCC and VSS (system ground) can be used to define two input configuration waveforms that each correspond to a different configuration option. In order to provide a third input configuration waveform, and thus a third configuration option, a time-varying configuration waveform is preferably used. The time-varying configuration waveform can be supplied by logic external to the integrated circuit.

In the second embodiment, however, the configuration selection circuit is designed to drive a time-varying output configuration waveform on an output pin. Additional configuration waveform signals can be driven by a configuration selection circuit, if additional dedicated or multiplexed output pins are allocated at start up. The input pin may thus be selectively coupled to the system VCC, VSS, or to any of the outputs. The selector circuit is responsible for sampling and comparing the input configuration waveform.

In a third embodiment of the present invention, the functions of the driver and selector circuits are performed by a sampler state machine. Using the sampler state machine reduces reliance on external software, hardware and firmware. The configuration selection circuit of the second embodiment further includes a configuration clock generator for providing a configuration clock signal. The configuration clock generator is provided such that a stable clock signal is available almost immediately after power up of the integrated circuit. The configuration clock generator is preferably a ring oscillator circuit. The configuration selection circuits of each embodiment can be used to select a clock multiplier for a processor.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

Figure 1:
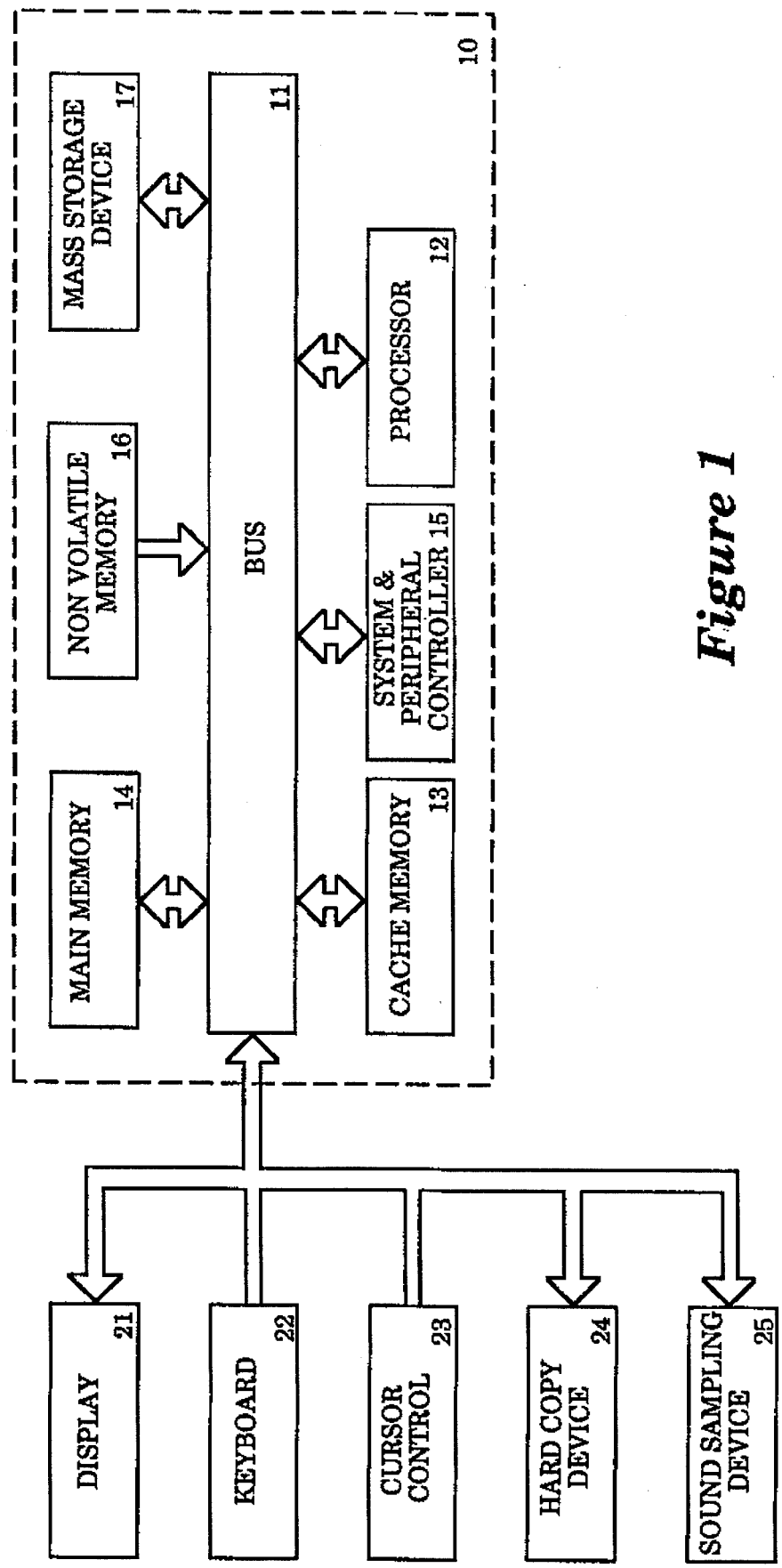
FIG. 1 is an overview of a computer system according to one embodiment of the present invention.

Referring to FIG. 1, an overview of a computer system according to one embodiment of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiments; alternative embodiments which may be conceived by one of ordinary skill in the art are considered within the scope of the claims set forth below.

As illustrated in FIG. 1, a computer system, as may be utilized by the illustrative embodiments of the present invention, generally comprises a bus or other communication means 11 for communicating information, a processor 12 coupled with bus 11 for processing information, a Random Access Memory (RAM) or other dynamic storage device 14 (commonly referred to as a main memory) coupled with bus 11 for storing information and instructions for processing means 12, a Read Only Memory (ROM) or other non-volatile storage device 16 coupled with bus 11 for storing non-volatile information and instructions for processor 12, a cache memory 13 coupled with bus 11, a system and peripheral controller 15 coupled with bus 11 for controlling peripheral devices, a data storage device 17, such as a magnetic disk and disk drive, coupled with bus 11 for storing information and instructions, a display device 21, such as a cathode ray tube, liquid crystal display, etc., coupled to bus 11 for displaying information to the computer user, an alpha-numeric input device 22 including alphanumeric and other keys, etc., coupled to bus 11 for communicating information and command selections to processor 12 and a cursor control 23 for controlling cursor movement. The system also includes a hard copy device 24, such as a plotter or printer, for providing a visual representation of the computer images. Hard copy device 24 is coupled with processor 12, main memory 14, non-volatile memory 16 and mass storage device 17 through bus 11. Finally, the system includes a sound recording and playback device 25 for providing audio recording and playback.

Of course, certain implementations and uses of the present invention may not require nor include all of the above components. For example, in certain implementations a keyboard and cursor control device for inputting information to the system may not be required. In other implementations, it may not be required to provide a display device for displaying information.

Figure 2:
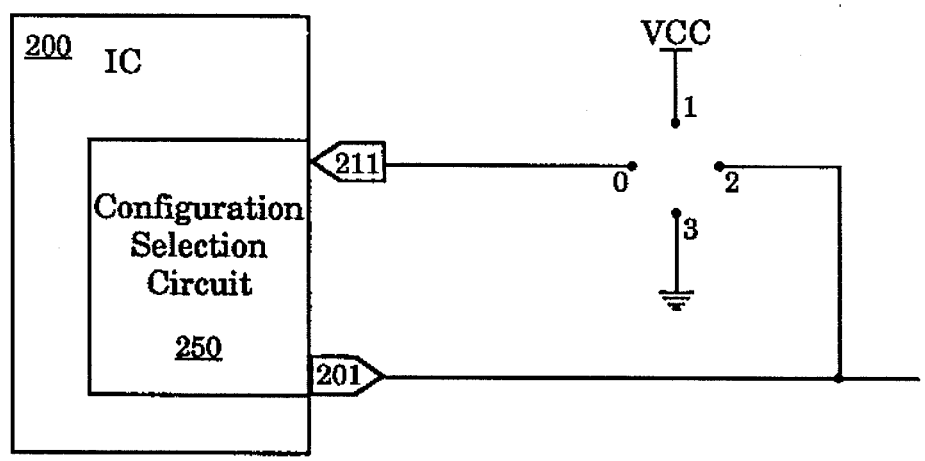
FIG. 2 illustrates an integrated circuit having a configuration selection circuit according to one embodiment of the present invention.

FIG. 2 illustrates an integrated circuit 200 that includes a configuration selection circuit 250 according to one embodiment of the present invention. The configuration selection circuit 250 is coupled to an output pin 201 and an input pin 211. In order to select a configuration option, the configuration selection circuit 250 samples the voltage level on the input pin 211 a predetermined number of times in order to construct an input configuration waveform. In order to perform the sampling operation, the configuration selection circuit 250 preferably includes a sample and hold circuit (not shown), as is well known in the art. The sample and hold circuit includes a series of latches, with one latch for each value to be sampled from the input configuration waveform. The voltage level on the input pin 211 is determined by a signal that is coupled to pin 211.

The input configuration waveform is compared to a number of predetermined configuration waveforms that are preferably stored in memory located on the integrated circuit. The comparator circuit (not shown) is used to assure that sampled waveforms match one of the predetermined waveforms, and to assure that each iteration of the waveform is identical. If the input configuration waveform is a known configuration waveform, the configuration option corresponding to the input configuration waveform is selected. Alternatively, a default configuration option may be selected if the input configuration waveform is unknown.

As discussed above, the input configuration waveform is determined by the signal that is coupled to the input pin 211. The DC signals of VCC and VSS (system ground) can be used to define two input configuration waveforms. In order to provide a third input configuration waveform, a time-varying configuration waveform is preferably used. The time-varying configuration waveform can be supplied by logic external to the integrated circuit. In the present embodiment, however, the configuration selection circuit 250 is designed to drive a time-varying output configuration waveform on the output pin 201. Additional configuration waveform signals can be driven by a configuration selection circuit if additional output pins, dedicated or multiplexed, are allocated at start up. Alternatively, logic can be interposed between the output pin 201 and the input pin 211, where the logic circuitry can be designed to alter the configuration waveform signal driven by the configuration selection circuit 250.

To select the desired input configuration waveform in the present embodiment, a jumper or wire may be used to couple the input pin 211 to VCC, VSS (system ground), or to the output pin 201. If the input pin 211 is coupled to VCC, the input configuration waveform will be all logic highs. If the input pin 211 is coupled to VSS, the input configuration waveform will be all logic lows. Finally, if the input pin 211 is coupled to the output pin 201, the input configuration waveform will be the output configuration waveform.

The configuration selection circuit 250 is preferably activated only when power is first supplied to the integrated circuit 200. However, the configuration selection circuit 250 can be designed to be enabled at some time after normal operation of the device has begun. A reset pulse (not shown) generated in response to power being supplied to the IC automatically causes the configuration selection circuit 250 to begin operation. One having ordinary skill in the art will recognize that the pulse can be generated by software after normal operation has begun.

Figure 3:
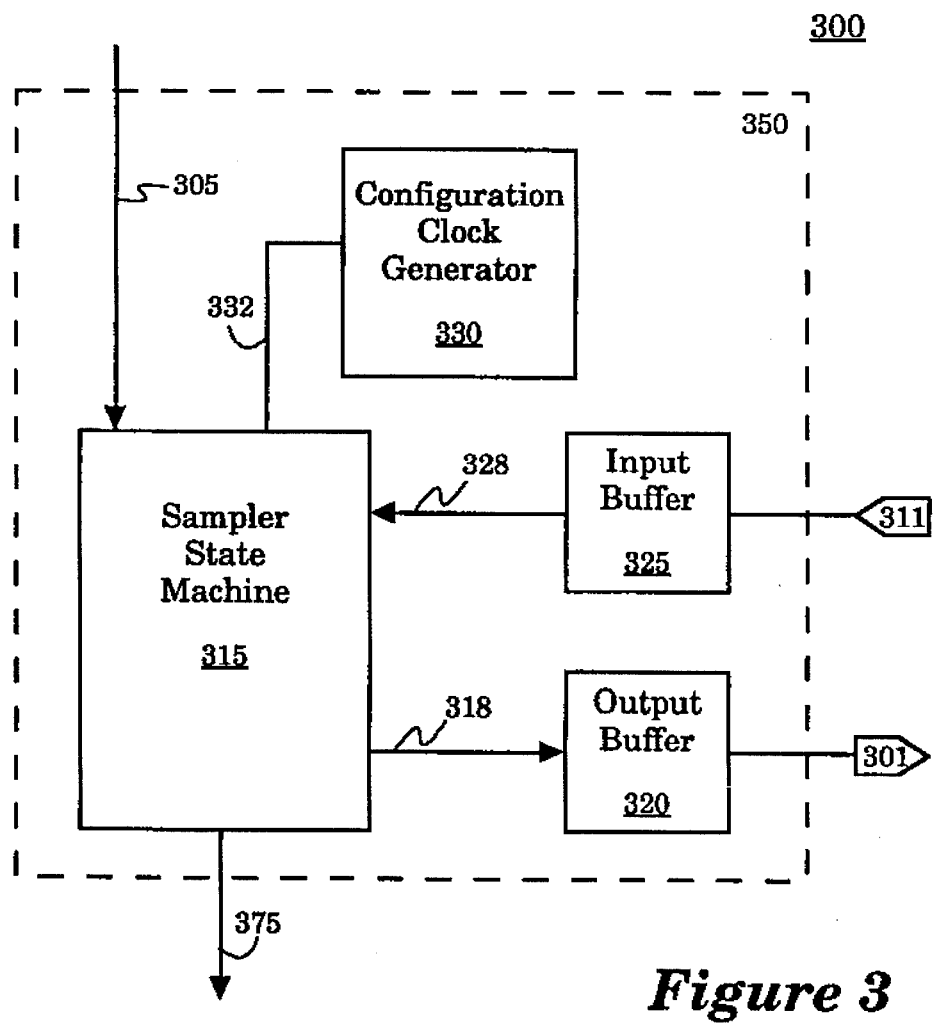
FIG. 3 illustrates the configuration selection circuit according to one embodiment of the present invention.

FIG. 3 illustrates, in greater detail, the configuration selection circuit 350 of one embodiment of the present invention for an IC 300. The configuration selection circuit 350 preferably includes a sampler state machine 315, which performs the sampling operation, an input buffer 325 coupled to the sampler state machine 315 and the input 311, an output buffer 320 coupled to the sampler state machine 315 and the output pin 301, and a configuration clock generator 330 coupled to the sampler state machine 315. A starting pulse (not shown) is delivered to the sampler state machine 315 via signal line 305. This pulse is preferably a reset pulse generated automatically by the integrated circuit upon power up of the device. In an alternative embodiment, this pulse can be generated by software, by a soft reset of the integrated circuit, or by other system hardware not on the IC. The pulse sets a latch or switch in the configuration selection circuit such that the configuration selection circuit begins operation.

In order to allow the sampler state machine 315 to begin operation as early as possible, a configuration clock generator 330 is provided. The configuration clock generator 330 is preferably a ring oscillator circuit that outputs a configuration clock signal having a frequency that is preferably less than or equal to the maximum operating frequency of the bus over which the configuration waveform signal will be driven. The configuration clock generator 330 is necessary because the system clock generator is typically not capable of generating a stable clock signal at power up of the system. A ring oscillator circuit is preferred because such circuits consume little power and can be implemented using a small amount of die space. It is possible that a configuration clock generator would be unnecessary if a valid clock signal can be provided to the state machine from some other source, e.g. the system clock. Once operation of the sampler state machine has begun, the sampler state machine 315 outputs a configuration waveform signal via signal line 318 to output buffer 320. The output configuration waveform is preferably a pulse train of a predetermined length. The output buffer passes the configuration waveform signal out to the output pin 301.

The sampler state machine 315 preferably drives a single pulse of the output configuration waveform, samples the input pin 311 via the input buffer 325, and stores the sampled value. Each state of driving and sampling preferably takes one clock cycle. The sampler state machine 315 follows the same procedure for each pulse of the configuration wave form signal until the entire configuration waveform signal has been driven via the output pin 301. Sampler state machine 315 then compares the input configuration waveform that has been sampled on pin 311 to known configuration waveforms. If a match is found, the sampler state machine outputs a selected configuration option over the signal line 375, which is coupled to the appropriate internal logic (not shown) for defining the operation of the device. Simultaneously, sampler state machine 315 shuts itself off by resetting the switch or latch.

Figure 4:
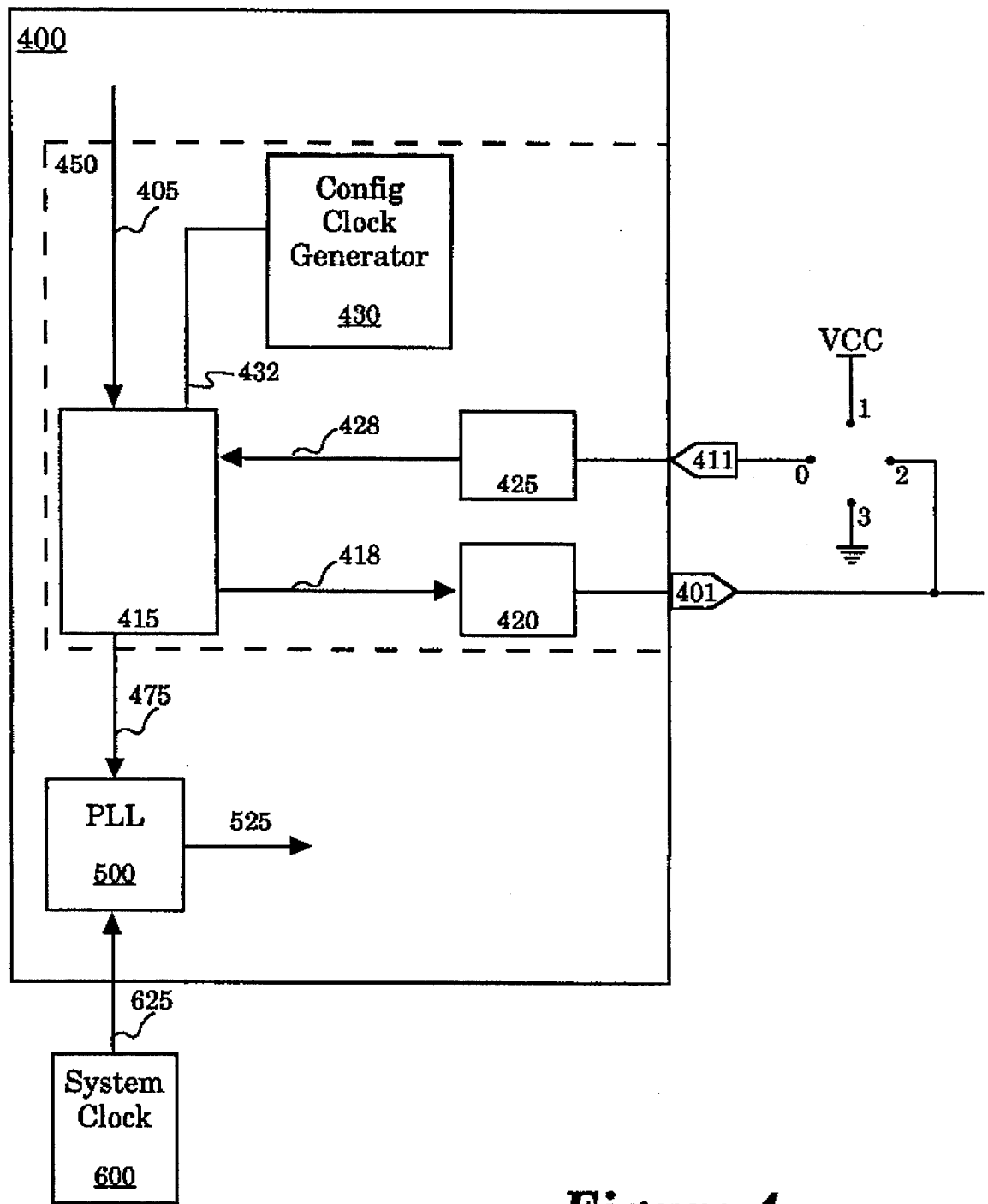
FIG. 4 illustrates a configuration selection circuit for selecting a clock multiplier to determine the core clock speed of a processor according to one embodiment of the present invention.

FIG. 4 is an illustrative embodiment of a configuration selection circuit used to determine the clock multiplier in a processor 400. In this example, the output pin 401 is preferably a multiplexed pin that is not required by the processor 400 prior to normal operation. In this embodiment, the processor is an IntelDX4™ and the output pin 401 is the BREQ pin, which is described in the Intel486™ DX Microprocessor Data Book. The BREQ pin is normally used by the bus control unit of the processor to request control of the bus.

The input pin 411 is preferably dedicated to determining the clock multiplier of the core clock for the processor 400. Alternatively, the input pin 411 may be a multiplexed pin that is selected considering the same criteria as used in determining the output pin 401. In this embodiment, the input pin is preferably the CLKMUL pin. In this case the maximum frequency of the configuration clock generator 430 is preferably less than 50 MHz. Again, the configuration clock generator 430 is preferably a ring oscillator circuit that, in this case, has a maximum output frequency of approximately 100 MHz that is divided by eight before being delivered to the sampler state machine 415. The sampler state machine 415 is turned on when a RESET pulse is delivered via signal line 405. This RESET pulse may be generated by known prior art power up circuits.

The sampler state machine 415 preferably drives the configuration waveform signal via signal line 418 to a BREQ output buffer 420. The signal line 418 preferably delivers a BREQEN signal (not shown) as well as the configuration waveform signal to the BREQ output buffer 420. The BREQEN signal enables the output buffer for use. The configuration waveform signal is then driven to the output pin 401. Control of the BREQ output buffer 420 and the BREQ output pin 411 are returned to the bus control unit of the processor after the clock multiplier option is selected by the configuration selection circuit 450.

The input configuration signal is sampled from the input pin 411 via the CLKMUL input buffer 425. The CLKMUL input buffer 425 simply drives the value of the voltage on the CLKMUL pin to the sampler state machine 415. In this embodiment, the input configuration waveform is not gated by any clocks. The sampler state machine 415 operates as described in relation to FIG. 3. When a selection is made, the sampler state machine 415 outputs a configuration option to the phase-locked loop (PLL) 500.

The PLL 500 is a phase-locked loop as is well known in the prior art. The PLL 500 receives, as its input, a system clock signal 600 via signal line 625. The PLL 500 multiplies this input clock signal by the multiplier supplied by the sampler state machine 415 via the signal line 475, and outputs a core clock signal via signal line 525. The signal line 475 is preferably 2-bits wide, but additional bits can be provided if more configuration options are desired. The multiplier provided to the PLL 500 is determined by the value of the 2-bit lines as detailed below in Table 1.

TABLE 1

| Internal Decoding of Bus Fractions | | |
| --- | --- | --- |
| Multiplier Option | Bit 1 | Bit 0 |
| 2× | 0 | 0 |
| 3× | 1 | 0 |
| 2.5× | 1 | 1 |

Figure 5:
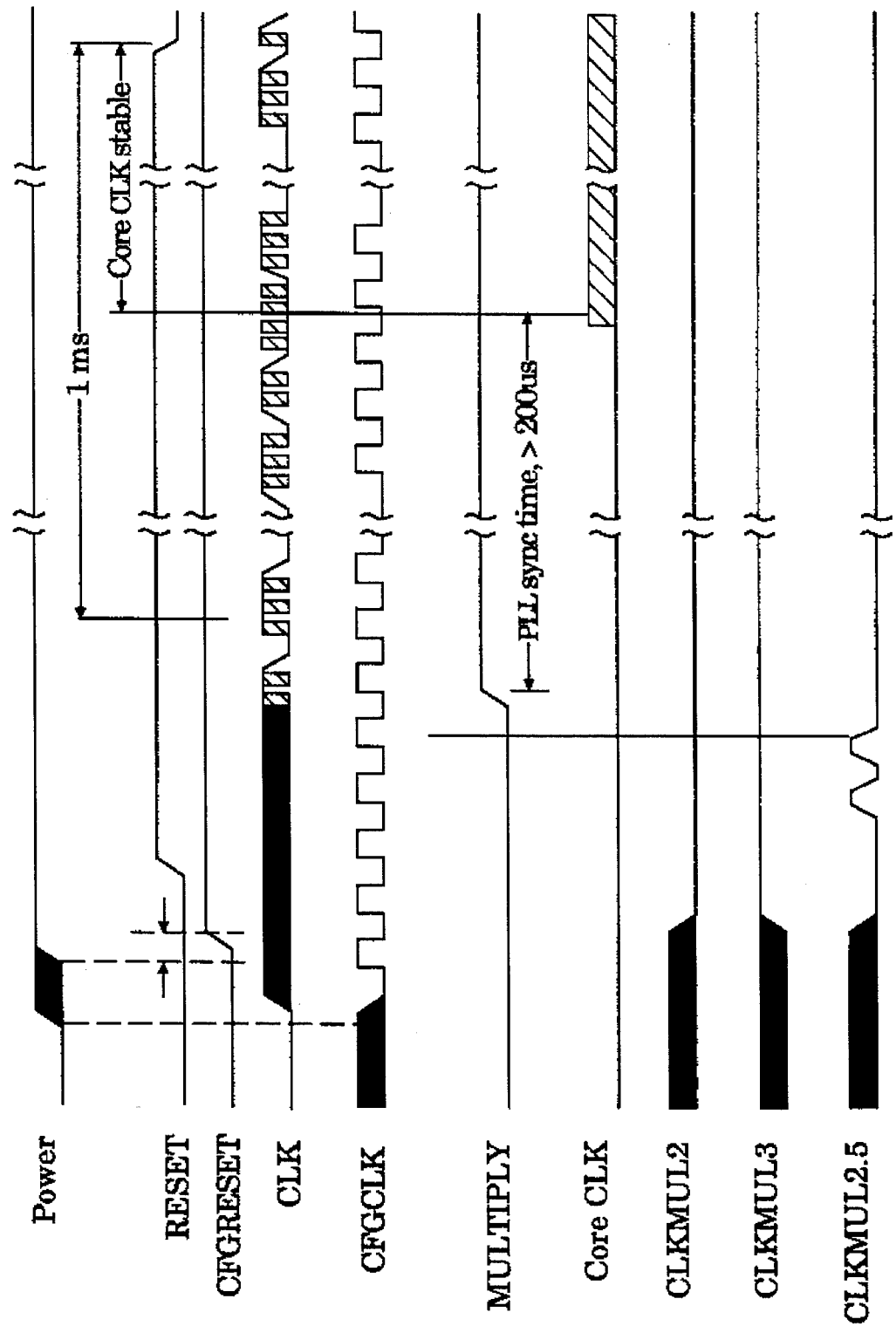
FIG. 5 is a timing diagram illustrating the timing requirements for the clock multiplier selection circuit.

FIG. 5 illustrates the timing of the clock multiplier configuration selection circuit illustrated in FIG. 4. As can be seen, some time shortly after power is supplied to the processor, an active RESET pulse is generated. The RESET pulse is generated by external hardware to reset all internal registers. The system clock (CLK) and VCC must be stable for at least 1 ms before the RESET pulse is deasserted. When the RESET pulse first goes active it may be seen that the CLK signal is not stable. However, the configuration clock generator is generating a stable clock signal (CFGCLK) for the sampler state machine by that time. Further, a configuration reset pulse (CFGRESET) may go active before RESET. The CFGRESET pulse causes the sampler state machine to begin operation.

Once the RESET pulse goes inactive, the processor must be ready to begin normal operation. Therefore, the core clock signal must be stable and ready for use. The stability of the core clock signal is affected by the time it takes the PLL to synchronize. In this example, the PLL synchronization time is approximately 200 microseconds. Therefore, the configuration selection circuit must select a valid configuration option, or multiplier, within 800 microseconds of the RESET pulse going active.

Figure 6:
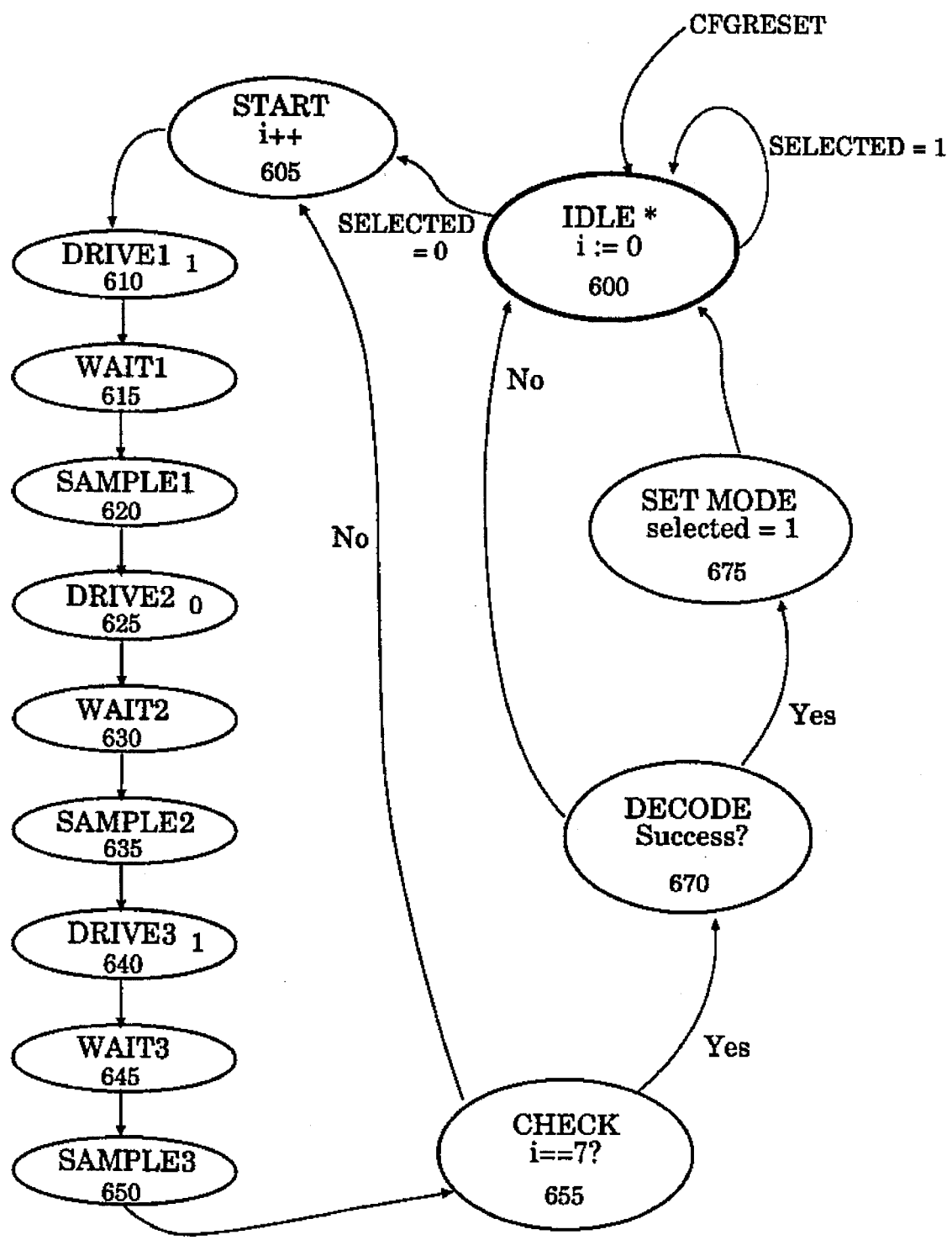
FIG. 6 is a state diagram illustrating the operation of a sampler state machine according to one embodiment of the present invention.

FIG. 6 is a state diagram illustrating the preferred operation of the sampler state machine for one embodiment of the configuration selection circuit. Initially, the sampler state machine is in an idle state 600. The active internal CFGRESET pulse is received shortly after start up. The active CFGRESET pulse resets all latches in the sampler state machine and forces the operation of a sampler state machine to start at state 605. In this embodiment, the configuration waveform signal is a three-pulse-wide pulse train that is driven a total of seven times over the output pin. The sampler state machine drives the first pulse of the pulse train, which, in this case, is preferably a logic high, at state 610. The sampler state machine then goes into a WAIT state for a predetermined period of time at state 615. The WAIT state is inserted to allow the voltage on the input pin to be stable and at the appropriate level when the sampler state machine samples the input pin for a first time, at state 620. The drive, wait and sample states are each preferably a single CFGCLK clock period long.

The sampler state machine, at state 625, then drives the second pulse of the configuration waveform signal, which, in this case, is a logic low. Again, the sampler state machine waits for the predetermined period of time, at state 630, and then samples the input pin a second time at state 635. The third pulse of the pulse train is a logic high and is driven by the sampler state machine at state 640, which then waits for a third predetermined period at state 645, and then samples the input pin once more at state 650. The WAIT states are inserted to insure reliability of the samples, and may be removed if reliability is otherwise assured.

At state 655, the sampler state machine determines the number of times that this procedure has been repeated. In this embodiment, for the sake of reliability, the pulse train of the configuration waveform signal is driven a total of seven times by using a counter. If the count is not equal to seven, the configuration waveform returns to the state 605. If the count is equal to seven, the sampler state machine compares the input configuration waveform to known configuration waveforms at state 670. Because the pulse width of the configuration waveform signal is three pulses and the number of configurations is seven, the input configuration waveform is 21-bits wide.

If the input configuration waveform is equal to all logic high bits, then the input pin is coupled to VCC and the clock multiplier is preferably equal to three, as detailed in Table 1. If the input configuration waveform is equal to all logic low bits, the input pin is coupled to VSS, and the clock multiplier is equal to two. If the input configuration waveform is equal to seven configuration waveform signals laid end-to-end, the input pin is coupled to the output pin, and the clock multiplier is preferably equal to 2.5. If the input configuration waveform is not equal to any known configuration waveforms, the sampler state machine returns to the IDLE state. However, because the latch that started the sampler state machine running has not been reset, the sampler state machine then immediately returns to the START state and goes through another seven passes as described above. If the decode is successful, the appropriate configuration option is selected and is driven to the output of the sampler state machine. The appropriate option is selected, and the latch is reset such that the sampler state machine is returned to the IDLE state.

Thus, method and apparatus for selecting three or more configuration options using a single input pin have been described. The configuration selection circuit of one embodiment is designed for automatic operation and selection of configuration options prior to normal operation of the integrated circuit. In the foregoing specification, the invention has been described with reference to specific exemplary embodiments thereof. It will, however, be evident that various modifications and changes may be made thereof without departing from the broader spirit and scope of the invention. The specification and drawings are, accordingly, to be regarded in an illustrative rather than a restrictive sense.

What is claimed is:

1. In an integrated circuit, a configuration selection circuit for defining an operating characteristic for the integrated circuit by selecting one of a plurality of configuration options, the configuration selection circuit comprising:

a power up detect circuit for generating a power up reset signal responsive to power up of the integrated circuit;

an input;

a sampler circuit for sampling an input voltage level at the input, the sampler circuit being reset and beginning sampling in response to the power up reset signal, the sampler circuit taking a plurality of samples, the plurality of samples forming an input configuration waveform;

a selector circuit for comparing the input configuration waveform to a plurality of known configuration waveforms and for selecting the configuration option which corresponds to the input configuration waveform when the input configuration waveform matches one of the plurality of known configuration waveforms.

2. The configuration selection circuit of claim 1, wherein the configuration selection circuit selects a first configuration option when the input configuration waveform is defined by coupling the input to a first voltage level.

3. The configuration selection circuit of claim 2, wherein the configuration selection circuit selects a second configuration option when the input configuration waveform is defined by coupling the input to a second voltage level.

4. The configuration selection circuit of claim 3, wherein the configuration selection circuit selects a third configuration option when the input configuration waveform is defined by coupling the input to a time-varying voltage level.

5. In an integrated circuit, a configuration selection circuit for defining an operating characteristic for the integrated circuit by selecting one of a plurality of configuration options, the configuration selection circuit comprising:

an output;

an input;

a driver circuit for driving an output configuration waveform on the output;

a sampler circuit for sampling an input voltage level at the input, the sampler circuit taking a plurality of samples, the plurality of samples forming an input configuration waveform;

a selector circuit for comparing the input configuration waveform to a plurality of known configuration waveforms, at least one of the known configuration waveforms corresponding to the output configuration waveform, and for selecting the configuration option which corresponds to the input configuration waveform when the input configuration waveform matches one of the plurality of known configuration waveforms.

6. The configuration selection circuit of claim 5, wherein the configuration selection circuit selects a first configuration option when the input configuration waveform is defined by coupling the input to a first voltage level.

7. The configuration selection circuit of claim 6, wherein the configuration selection circuit selects a second configuration option when the input configuration waveform is defined by coupling the input to a second voltage level.

8. The configuration selection circuit of claim 7, wherein the configuration selection circuit selects a third configuration option when the input configuration waveform is defined by coupling the input to the output.

9. The configuration selection circuit of claim 8, wherein the configuration selection circuit further includes:

logic circuitry coupled between the output and the input, the logic circuitry for varying the output configuration waveform generating the input configuration waveform such that the configuration selection circuit selects a fourth configuration option.

10. The configuration selection circuit of claim 5, further comprising a power up reset circuit for resetting a latch to enable the configuration selection circuit wherein the configuration selection circuit sets the latch to disable the configuration selection circuit after the configuration option is selected.

11. In an integrated circuit, a configuration selection circuit for defining an operating characteristic for the integrated circuit by selecting one of a plurality of configuration options, the configuration selection circuit comprising:

a configuration clock generator for generating a configuration clock signal;

an output;

an input for coupling to one of a plurality of configuration waveform sources during configuration of the integrated circuit;

a sampler state machine coupled to the output, the input and the configuration clock signal, the sampler state machine operating according to the configuration clock signal, the sampler state machine for driving an output configuration waveform on the output, for sampling an input configuration waveform at the input, for comparing the input configuration waveform to a plurality of known configuration waveforms at least one of the known configuration waveforms corresponding to the output configuration waveform, and for selecting the configuration option which corresponds to the input configuration waveform when the input configuration waveform is equal to one of the plurality of known configuration waveforms.

12. The configuration selection circuit of claim 11, wherein the configuration selection circuit selects a first configuration option when the input configuration waveform is defined by coupling the input to a first voltage level.

13. The configuration selection circuit of claim 12, wherein the configuration selection circuit selects a second configuration option when the input configuration waveform is defined by coupling the input to a second voltage level.

14. The configuration selection circuit of claim 13, wherein the configuration selection circuit selects a third configuration option when the input configuration waveform is defined by coupling the input to the output.

15. The configuration selection circuit of claim 14, wherein the configuration selection circuit further includes:

logic circuitry coupled between the output and the input, the logic circuitry for varying the output configuration waveform generating the input configuration waveform such that the configuration selection circuit selects a fourth configuration option.

16. The configuration selection circuit of claim 15, wherein the sampler state machine begins operation in response to receiving a RESET pulse that is active for a specified duration, the configuration selection circuit defines the operating characteristic before the RESET pulse goes inactive, and the sampler state machine ceases operations in response to the configuration option being selected.

17. A computer system comprising:

a memory;

a bus, coupled to the memory; and a integrated circuit coupled to the bus, the integrated circuit including a configuration circuit for defining an operating characteristic for the integrated circuit by selecting one of a plurality of configuration options the configuration selection circuit further comprising:

an input for coupling to one of a plurality of configuration waveform sources during configuration of the integrated circuit;

an output;

a driver circuit for driving an output configuration waveform on the output;

a sampler circuit for sampling an input voltage level at the input, the sampler circuit taking a plurality of samples, the plurality of samples forming an input configuration waveform;

selector circuit for comparing the input configuration waveform to a plurality of known configuration waveforms, at least one of the known configuration waveforms corresponding to the output configuration waveform, and for selecting the configuration option which corresponds to the input configuration waveform when the input configuration waveform matches one of the plurality of known configuration waveforms.

18. The computer system of claim 17, wherein the configuration selection circuit selects a first configuration option when the input configuration waveform is defined by coupling the input to a first voltage level.

19. The computer system of claim 18, wherein the configuration selection circuit selects a second configuration option when the input configuration waveform is defined by coupling the input to a second voltage level.

20. The configuration selection circuit of claim 19, wherein the configuration selection circuit selects a third configuration option when the input configuration waveform is defined by coupling the input to a time-varying voltage level.

21. A method for defining an operating characteristic for an integrated circuit by selecting one of a plurality of configuration options, the method comprising the steps of:

driving a first pulse of an output configuration waveform over an output;

sampling a voltage level at an input to produce a first sample;

driving a second pulse of the output configuration waveform over the output;

sampling the voltage level at the input to produce a second sample;

comparing an input configuration waveform formed by the first and second samples to a plurality of known configuration waveforms, at least one of the known configuration waveforms corresponding to the output configuration waveform; and selecting the configuration option which corresponds to the input configuration waveform when the input configuration waveform is equal to one of the plurality of known configuration waveforms.

22. The method according to claim 21, wherein the method further includes the steps of:

driving a third pulse of the configuration waveform over the output;

sampling the voltage level at the input to produce a third sample, wherein the input configuration waveform is formed by the first, second and third samples.

23. In an integrated circuit, a configuration selection means for defining an operating characteristic for the integrated circuit by selecting one of a plurality of configuration options, the configuration selection means comprising:

an input;

an output;

a driver means for driving an output configuration waveform on the output;

a sampler means for sampling an input voltage level at the input, the sampler means taking a plurality of samples, the plurality of samples forming an input configuration waveform;

selector means for comparing the input configuration waveform to a plurality of known configuration waveforms, at least one of the known configuration waveforms corresponding to the output configuration waveform, and for selecting the configuration option which corresponds to the input configuration waveform when the input configuration waveform matches one of the plurality of known configuration waveforms.

24. The configuration selection means of claim 23, wherein the configuration selection means selects a first configuration option when the input configuration waveform is defined by coupling the input to a first voltage level.

25. The configuration selection means of claim 24, wherein the configuration selection means selects a second configuration option when the input configuration waveform is defined by coupling the input to a second voltage level.

26. The configuration selection means of claim 25, wherein the configuration selection means selects a third configuration option when the input configuration waveform is defined by coupling the input to a time-varying voltage level.

27. A computer system comprising:

a memory;

a bus, coupled to the memory; and a integrated circuit coupled to the bus, the integrated circuit including a configuration means for defining an operating characteristic for the integrated circuit by selecting one of a plurality of configuration options the configuration selection means further comprising:

an input;

an output;

a driver means for driving an output configuration waveform on the output;

a sampler means for sampling an input voltage level at the input, the sampler means taking a plurality of samples, the plurality of samples forming an input configuration waveform;

selector means for comparing the input configuration waveform to a plurality of known configuration waveforms, at least one of the known configuration waveforms corresponding to the output configuration waveform, and for selecting the configuration option which corresponds to the input configuration waveform when the input configuration waveform matches one of the plurality of known configuration waveforms.

28. The computer system of claim 27, wherein the configuration selection means selects a first configuration option when the input configuration waveform is defined by coupling the input to a first voltage level.

29. The computer system of claim 28, wherein the configuration selection means selects a second configuration option when the input configuration waveform is defined by coupling the input to a second voltage level.

30. The configuration selection means of claim 29, wherein the configuration selection means selects a third configuration option when the input configuration waveform is defined by coupling the input to a time-varying voltage level.

31. In an integrated circuit, a configuration selection circuit for defining an operating characteristic for the integrated circuit by selecting one of a plurality of configuration options, the configuration selection circuit comprising:

a driver circuit for driving an output configuration waveform;

a sampler circuit coupled to receive the output configuration waveform during configuration of the integrated circuit, the sampler circuit for taking a plurality of samples forming an input configuration waveform;

a selector circuit for comparing the input configuration waveform to a plurality of configuration waveforms and for selecting the configuration option which corresponds to the input configuration waveform when the input configuration waveform matches one of the plurality of configuration waveforms.

32. The configuration selection circuit of claim 31 wherein the sampler circuit is decoupled from the driver circuit after the integrated circuit is configured.

* * * * *